(12) United States Patent
Yasumatsu (10) Patent No.: US 9,785,040 B2
(45) Date of Patent: Oct. 10, 2017

(54) WAVELENGTH CONVERSION ELEMENT, LIGHT SOURCE DEVICE, AND PROJECTOR

(71) Applicant: SEIKO EPSON CORPORATION, Tokyo (JP)

(72) Inventor: Wataru Yasumatsu, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/185,612

(22) Filed: Jun. 17, 2016

(65) Prior Publication Data

US 2016/0377968 A1    Dec. 29, 2016

(30) Foreign Application Priority Data

Jun. 23, 2015  (JP) ................. 2015-125566

(51) Int. Cl.
| | |
|---|---|
| *G03B 21/14* | (2006.01) |
| *H04N 9/31* | (2006.01) |
| *G03B 21/20* | (2006.01) |
| *G02B 27/14* | (2006.01) |

(52) U.S. Cl.
CPC ......... *G03B 21/204* (2013.01); *G02B 27/141* (2013.01); *H04N 9/3105* (2013.01); *H04N 9/3158* (2013.01); *H04N 9/3197* (2013.01)

(58) Field of Classification Search
CPC .... G03B 21/14; G03B 21/005; G03B 21/006; G03B 21/008; G03B 21/204; G02B 27/10; G02B 27/1006; H04N 9/3197
See application file for complete search history.

(56) References Cited

U.S. PATENT DOCUMENTS

| | | | | |
|---|---|---|---|---|
| 2013/0107573 | A1* | 5/2013 | Kadomi | G02F 1/133617 362/611 |
| 2015/0308637 | A1* | 10/2015 | Chang | G03B 21/204 362/84 |
| 2016/0091712 | A1* | 3/2016 | Egawa | G03B 21/204 353/31 |
| 2017/0052362 | A1* | 2/2017 | Chou | G02B 26/008 |
| 2017/0160627 | A1* | 6/2017 | Ikesue | G03B 21/204 |

FOREIGN PATENT DOCUMENTS

| | | |
|---|---|---|
| JP | 2013-122930 A | 6/2013 |
| JP | 2013-187043 A | 9/2013 |
| JP | 2014-157698 A | 8/2014 |

* cited by examiner

Primary Examiner — William C Dowling
(74) Attorney, Agent, or Firm — Oliff PLC (57) ABSTRACT

A wavelength conversion element includes: a substrate; an intermediate layer that is provided on the substrate and has a refractive index less than a refractive index of the substrate; a dichroic layer that is provided on the intermediate layer; and a fluorescent layer that is provided on the dichroic layer and that is excited by light with a first wavelength band and thereby emits light with a second wavelength band different from the first wavelength band.

18 Claims, 7 Drawing Sheets

WAVELENGTH CONVERSION ELEMENT, LIGHT SOURCE DEVICE, AND PROJECTOR

BACKGROUND

1. Technical Field

The present invention relates to a wavelength conversion element, a light source device, and a projector.

2. Related Art

In recent years, solid-state light sources such as semiconductor lasers capable of outputting light with high luminance and high output has been noticed to be used as light source devices used for projectors. As such a light source device, there is known a light source in which a dichroic layer and a fluorescent layer are laminated on one surface side of a transparent substrate and a non-reflection coat layer is formed on an opposite surface side (for example, see JP-A-2013-122930).

However, since part of fluorescence, P-polarized component, satisfying a brewster condition passes through the dichroic layer and the substrate in the foregoing light source device, the fluorescence may not be efficiently used.

SUMMARY

An advantage of some aspects of the invention is to provide a wavelength conversion element with high light use efficiency. Another advantage of some aspects of the invention is to provide a light source device including the wavelength conversion element. Still another advantage of some aspects of the invention is to provide a projector including the light source device.

According to a first aspect of the invention, there is provided a wavelength conversion element including: a substrate; an intermediate layer that is provided on the substrate and has a refractive index less than a refractive index of the substrate; a dichroic layer that is provided on the intermediate layer; and a fluorescent layer that is provided on the dichroic layer and that is excited by light with a first wavelength band and thereby emits light with a second wavelength band different from the first wavelength band.

According to the first aspect of the invention, the wavelength conversion element can totally reflect the light with the second wavelength band in the interface between the intermediate layer and the dichroic layer. Accordingly, since a component transmitted through the dichroic layer and the substrate and emitted to the outside is reduced, the light with the second wavelength band can be efficiently used.

In the first aspect of the invention, it is preferable that the dichroic layer has a multi-layer film structure in which at least one first laminated film and at least one second laminated film having a refractive index greater than a refractive index of the first laminated film are alternately laminated, and $\theta_1 > \theta_1'$ is satisfied, where $n_L$ represents the refractive index of the first laminated film, $n_H$ represents the refractive index of the second laminated film, $\theta_1$ represents an angle of incidence of light satisfying a brewster condition in a boundary between the first laminated film and the second laminated film, $\theta_1'$ represents a critical angle in the intermediate layer, N represents the refractive index of the intermediate layer, $\theta_1$ is defined as $A \tan(n_L/n_H)$, and $\theta_1'$ is defined as $A \sin(N/n_L)$.

With this configuration, the intermediate layer totally reflects light that satisfies the brewster condition to thereby reach the interface between the dichroic layer and the intermediate layer. Thus, it is possible to efficiently use the light.

In the first aspect of the invention, it is preferable that $n_a > n_L$ is satisfied where $n_a$ is a refractive index of the fluorescent layer.

With this configuration, since a ratio of the light satisfying the brewster condition from the fluorescent layer to the intermediate layer is small, it is possible to efficiently use the light.

In the first aspect of the invention, it is preferable that the dichroic layer transmits light with the first wavelength band and reflects light with the second wavelength band.

With this configuration, it is possible to provide a transmissive wavelength conversion element capable of efficiently extracting the light with the second wavelength band to the outside.

In the first aspect of the invention, it is preferable that the dichroic layer reflects light with the first wavelength band and light with the second wavelength band.

With this configuration, it is possible to provide a reflective wavelength conversion element capable of efficiently extracting the light with the second wavelength band to the outside.

In the first aspect of the invention, it is preferable that the fluorescent layer is configured of one of a fluorescent material and a resin material, a fluorescent material and an inorganic material, and only a fluorescent material.

With this configuration, it is possible to efficiently extract the light with the second wavelength band generated in the fluorescent layer of any of various aspects to the outside.

According to a second aspect of the invention, there is provided a light source device including the wavelength conversion element according to the first aspect of the invention and a light source that emits light with the first wavelength band.

Since the light source device according to the second aspect of the invention includes the wavelength conversion element, it is possible to efficiently emit the light with the second wavelength band.

According to a third aspect of the invention, there is provided a projector including: the light source device according to the second aspect of the invention; a light modulation device that forms image light by modulating light emitted from the light source device according to image information; and a projection optical system that projects the image light.

Since the projector according to the third aspect of the invention includes the light source device, use efficiency of the light is high.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the drawings.

In the drawings used in the following description, characteristic portions are expanded and indicated to easily clarify characteristics for convenience in some cases, and thus dimension ratios or the like of constituent elements are not limited to the actual dimension ratios.

First Embodiment

Figure 1:
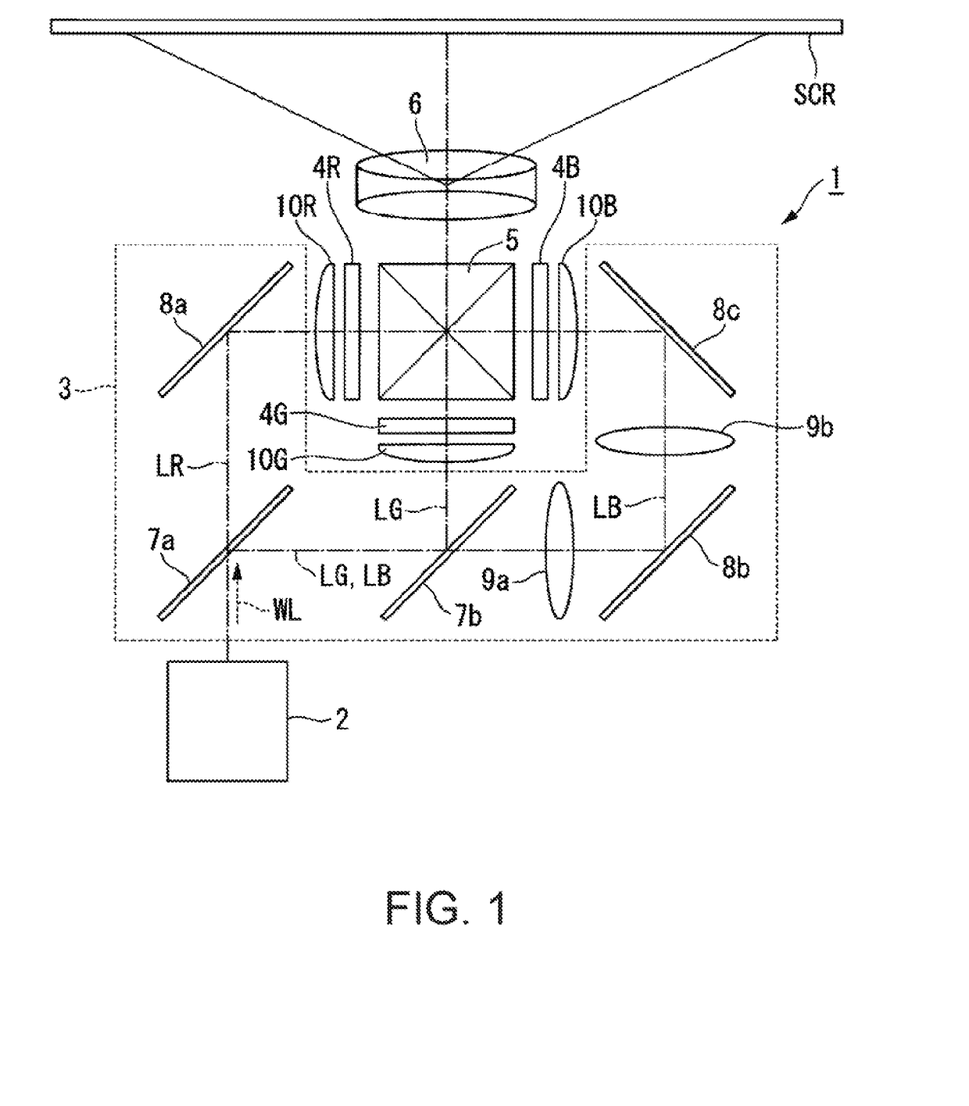
FIG. 1 is a schematic diagram illustrating the configuration of a projector according to a first embodiment.

FIG. 1 is a diagram illustrating a schematic configuration of a projector according to a first embodiment.

As illustrated in FIG. 1, a projector 1 according to the embodiment is a projection type image display apparatus that displays a color image on a screen SCR. The projector 1 uses three light modulation devices corresponding to pieces of color light of red light LR, green light LG, and blue light LB. The projector 1 uses a semiconductor laser capable of obtaining light with high luminance and high output as a light source of a light source device 2.

The projector 1 schematically includes the light source device 2, a color separation optical system 3, a red light modulation device 4R, a green light modulation device 4G, a blue light modulation device 4B, a combination optical system 5, and a projection optical system 6.

The light source device 2 emits white illumination light WL to the color separation optical system 3. A light source device which is one embodiment of the invention to be described below is used in the light source device 2.

The color separation optical system 3 separates the white illumination light WL emitted from the light source device 2 into the red light LR, the green light LG, and the blue light LB. The color separation optical system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a has a function of separating the illumination light WL emitted from the light source device 2 into the red light LR, the green light LG, and the blue light LB. The first dichroic mirror 7a transmits the red light LR and reflects the green light LG and the blue light LB. The second dichroic mirror 7b has a function of separating the light reflected from the first dichroic mirror 7a into the green light LG and the blue light LB. The second dichroic mirror 7b reflects the green light LG and transmits the blue light LB.

The first reflection mirror 8a is disposed in a light path of the red light LR. The first reflection mirror 8a reflects the red light LR transmitted through the first dichroic mirror 7a toward the red light modulation device 4R. The second reflection mirror 8b and the third reflection mirror 8c are disposed in a light path of the blue light LB. The second reflection mirror 8b and the third reflection mirror 8c reflect the blue light LB transmitted through the second dichroic mirror 7b toward the blue light modulation device 4B. The green light LG is reflected from the second dichroic mirror 7b to travel toward the green light modulation device 4G.

The first relay lens 9a and the second relay lens 9b are disposed on the light emission side of the second dichroic mirror 7b in the light path of the blue light LB. The first relay lens 9a and the second relay lens 9b have a function of compensating for light loss of the blue light LB caused by the light path length of the blue light LB being longer than the light path length of the red light LR or the green light LG.

The red light modulation device 4R modulates the red light LR according to image information to form image light corresponding to the red light LR. The green light modulation device 4G modulates the green light LG according to image information to form image light corresponding to the green light LG. The blue light modulation device 4B modulates the blue light LB according to image information to form image light corresponding to the blue light LB.

For example, transmissive liquid crystal panels are used in the red light modulation device 4R, the green light modulation device 4G, and the blue light modulation device 4B. A pair of polarization plates (not illustrated) are disposed on the incidence side and the emission side of the liquid crystal panel. The polarization plates transmit linear polarized light in a specific direction.

A field lens 10R is disposed on the incidence side of the red light modulation device 4R. A field lens 10G is disposed on the incidence side of the green light modulation device 4G. A field lens 10B is disposed on the incidence side of the blue light modulation device 4B. The field lens 10R parallelizes the red light LR incident on the red light modulation device 4R. The field lens 10G parallelizes the green light LG incident on the green light modulation device 4G. The field lens 10B parallelizes the blue light LB incident on the blue light modulation device 4B.

The combination optical system 5 combines the pieces of image light corresponding to the red light LR, the green light LG, and the blue light LB and emits the combined image light to the projection optical system 6. For example, a cross dichroic prism is used in the combination optical system 5.

The projection optical system 6 is configured of a projection lens group including a plurality of projection lenses. The projection optical system 6 expands and projects the image light combined by the combination optical system 5 to the screen SCR. Accordingly, the expanded color image is displayed on the screen SCR.

Figure 2:
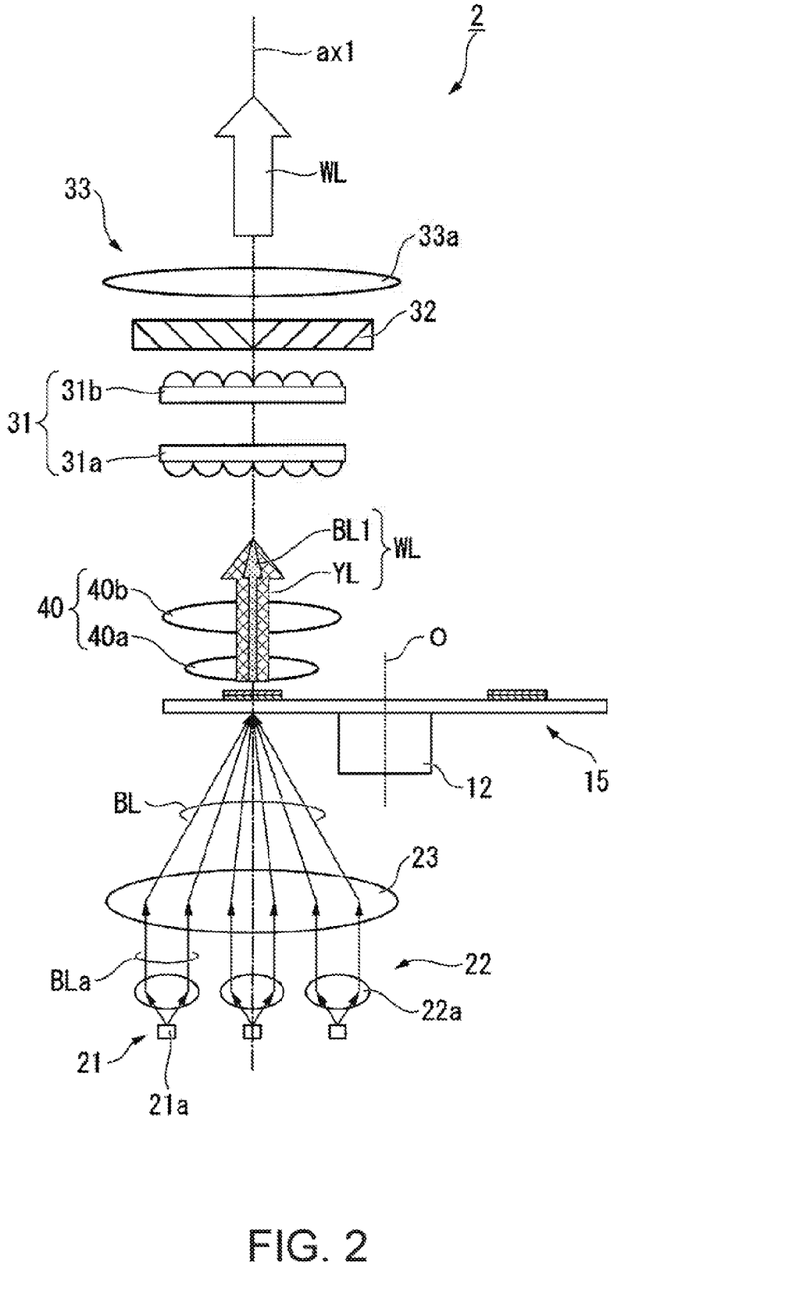
FIG. 2 is a diagram illustrating a schematic configuration of a light source device.

Next, the light source device 2 will be described.

FIG. 2 is a diagram illustrating a schematic configuration of the light source device 2. As illustrated in FIG. 2, a light-emitting unit 21, a collimating optical system 22, a condensing optical system 23, a fluorescent wheel (fluorescent light-emitting element) 15, a pickup optical system 40, an integrator optical system 31, a polarization conversion element 32, and a superimposition optical system 33 are sequentially disposed along an illumination optical axis ax1 in the light source device 2 according to the embodiment.

The light-emitting unit 21 includes a plurality of semiconductor lasers (light-emitting elements) 21a. The plurality of semiconductor lasers 21a are disposed to be arranged in an array form in a plane orthogonal to the illumination optical axis ax1. The number of semiconductor lasers 21a is not particularly limited.

The semiconductor laser 21a emits, for example, blue excitation light BLa. The excitation light BLa is emitted toward the collimating optical system 22.

The light-emitting unit 21 includes the plurality of semiconductor lasers 21a, and thus emits a plurality of pieces of excitation light BLa. Hereinafter, a bundle of the plurality of pieces of excitation light BLa are referred to as excitation light BL. The excitation light BL corresponds to "light with a first wavelength band" in according to an aspect of the invention and the light-emitting unit 21 corresponds to a "light source" in according to an aspect of the invention.

The excitation light BL emitted from the light-emitting unit 21 is incident on the collimating optical system 22. The collimating optical system 22 converts the excitation light BLa into a parallel light flux. The collimating optical system 22 is configured to include, for example, a plurality of collimating lenses 22a disposed to be arranged in an array form. The plurality of collimating lenses 22a are disposed to correspond to the plurality of semiconductor lasers 21a.

The excitation light BL passing through the collimating optical system 22 is incident on the condensing optical system 23. The condensing optical system 23 condenses the excitation light BL to be incident on the fluorescent wheel 15.

Figure 3A:
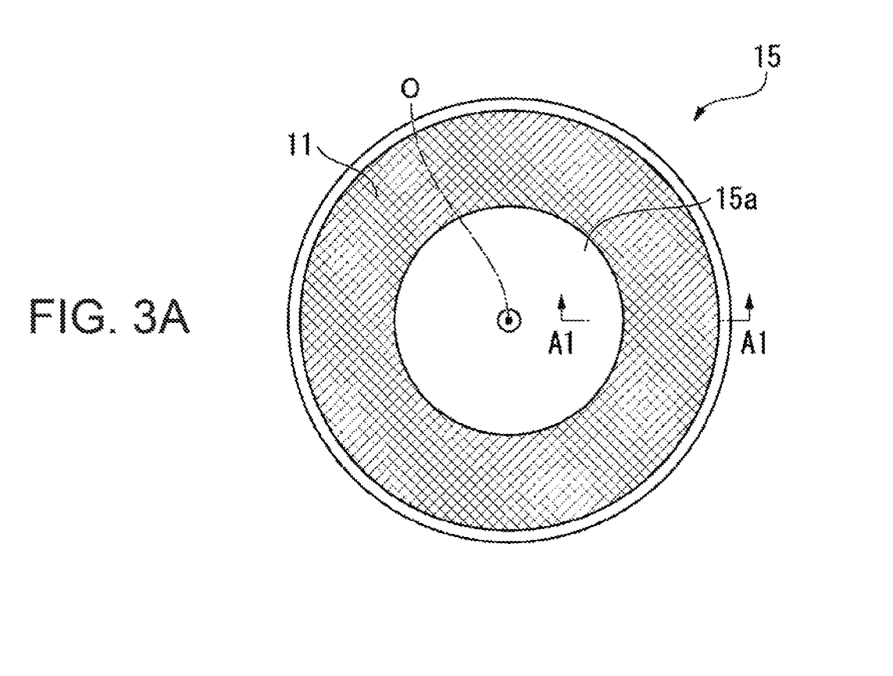
FIGS. 3A and 3B are configuration diagrams illustrating an example of a fluorescent wheel.
Figure 3B:
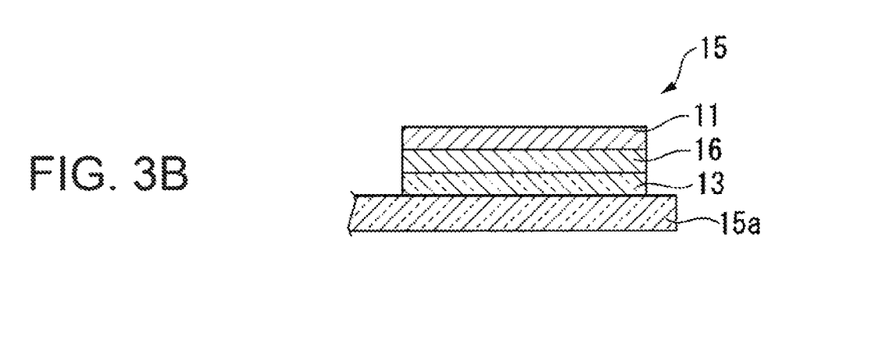

FIGS. 3A and 3B are configuration diagrams illustrating an example of the fluorescent wheel 15. FIG. 3A is a plan view and FIG. 3B is a sectional view taken along the line A1-A1 of FIG. 3A.

In the embodiment, the fluorescent wheel 15 is a transmissive rotation fluorescent plate. As illustrated in FIGS. 3A and 3B, the fluorescent wheel 15 includes a discoid rotation substrate 15a that is rotationally driven around a rotation shaft O by a motor 12 (see FIG. 2), a ring-shaped intermediate layer 13 that is formed in a circumferential direction (rotation direction) on one surface side of the rotation substrate 15a, a dichroic layer 16 that is formed on the intermediate layer 13, and a fluorescent layer 11 that is formed on the dichroic layer 16.

The rotation substrate 15a is rotated by a predetermined number of rotations when the projector 1 is used. Accordingly, since continuous incidence of the excitation light BL on a specific region of the fluorescent layer 11 is suppressed, the life of the fluorescent layer 11 is prolonged.

The rotation substrate 15a is formed of a material that transmits the excitation light BL. As the material of the rotation substrate 15a, for example, quartz glass, crystal, sapphire, optical glass, or transparent resin can be used. In the embodiment, a discoid glass substrate is used as the rotation substrate 15a. Therefore, the refractive index of the rotation substrate 15a is 1.5.

The fluorescent layer 11 converts the excitation light BL (blue light) into fluorescent light YL which is yellow light including red light and green light. Fluorescent light YL corresponds to "light with a second wavelength band" in according to an aspect of the invention.

The fluorescent layer 11 is formed of, for example, a layer containing $(Y, Gd)_3(Al, Ga)_5O_{12}:Ce$ which is a YAG-based fluorescent material. The fluorescent layer 11 has a function of absorbing the excitation light BL (blue light) and converting the excitation light BL into yellow fluorescent light YL.

The fluorescent layer 11 may be configured of only the above-described fluorescent material or may be configured of a fluorescent particle and a binder. A resin material or an inorganic material is used as the binder. The refractive index (average refractive index) of the fluorescent layer formed of a fluorescent particle and a binder is defined by a concentration ratio between the fluorescent material and the binder.

For example, when N1 is the refractive index of the fluorescent particle, N2 is the refractive index of the binder, α is a fluorescent ratio, and β is a binder ratio (where α+β=1 is assumed to be satisfied), an average refractive index of the fluorescent layer can be defined as αN1+βN2.

The intermediate layer 13 has a refractive index less than the refractive index of 1.5 of the rotation substrate 15a. In the embodiment, the intermediate layer 13 is formed of, for example, a transparent silica glass and the refractive index of the intermediate layer 13 is set to 1.25, as will be described below. The intermediate layer 13 is supported by the rotation substrate 15a via an adhesive layer (not illustrated).

The intermediate layer 13 is formed, for example, by gelating a $SiO_2$-PVA solution using silica glass ($SiO_2$) and polyvinyl alcohol (PVA), flowing the gelated solution in a desired mold, and baking a precursor of the silica glass dried in the atmosphere at a high temperature equal to or greater than 1000° C.

The dichroic layer 16 functions as a dichroic mirror and has characteristics of transmitting the excitation light BL and reflecting the fluorescent light YL emitted from the fluorescent layer 11.

A part of the excitation light BL incident on the fluorescent layer 11 is absorbed into the fluorescent material to be converted into the fluorescent light YL. The fluorescent light YL is reflected from the dichroic layer 16 or is emitted directly from the fluorescent layer 11 to the outside. On the other hand, a component (the blue light BL1 which is a partial component in the excitation light BL) of the excitation light BL not absorbed into the fluorescent layer 11 is emitted from the fluorescent layer 11 to the outside.

The light source device 2 combines the fluorescent light YL and the blue light BL1 emitted from the fluorescent layer 11 to emit the white illumination light WL.

Figure 4:
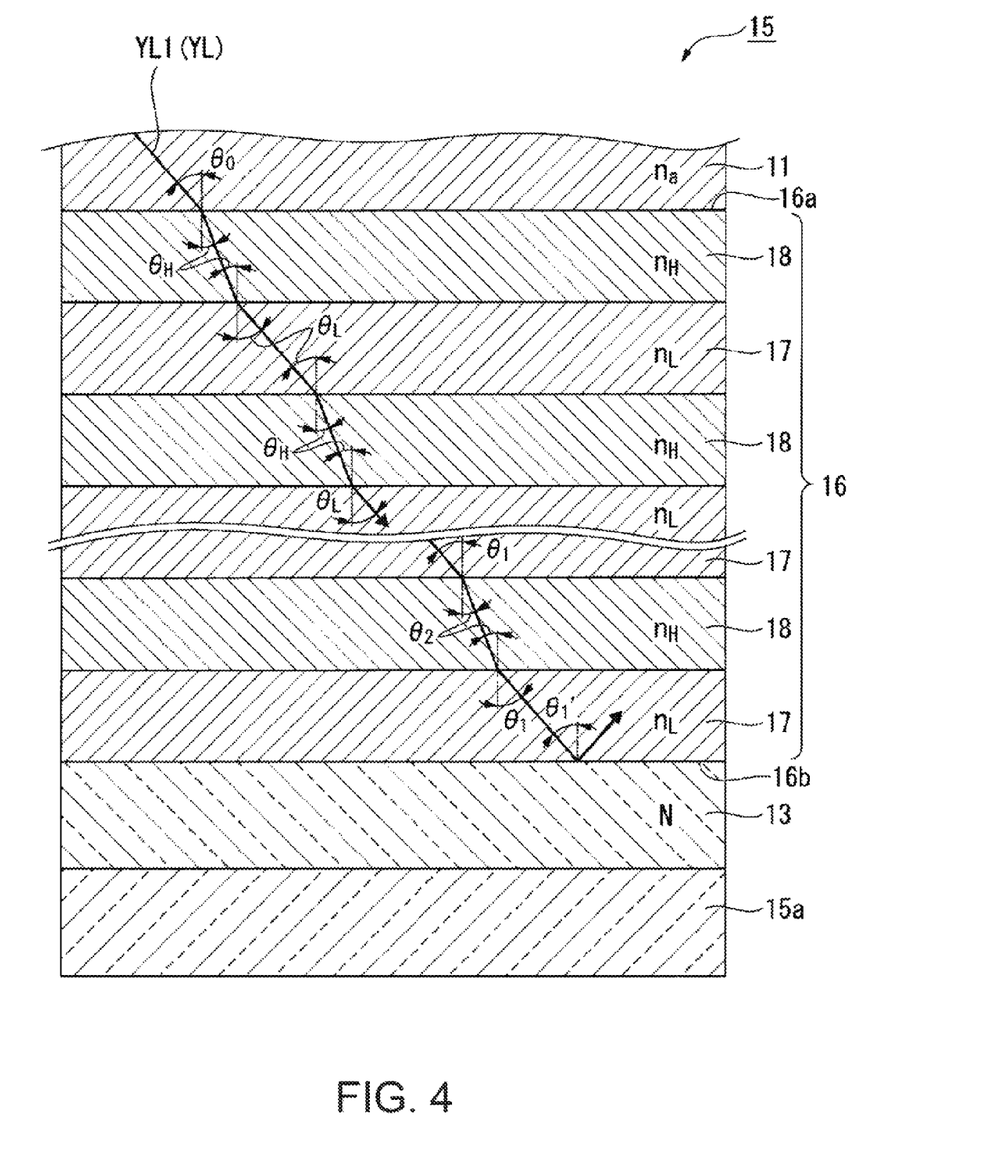
FIG. 4 is a sectional view illustrating the configuration of main units of the fluorescent wheel.

FIG. 4 is a sectional view illustrating the configuration of main units of the fluorescent wheel 15. As illustrated in FIG. 4, in the embodiment, the dichroic layer 16 has, for example, a multi-layer film structure in which first laminated films 17 formed of $SiO_2$ and second laminated films 18 formed of $TiO_2$ are alternately laminated. The refractive index of the second laminated film 18 ($TiO_2$) is greater than the refractive index of the first laminated film 17 ($SiO_2$).

In the embodiment, the first laminated film 17 is formed in the boundary of the dichroic layer 16 with the intermediate layer 13 and the second laminated film 18 is formed in the boundary of the dichroic layer 16 with the fluorescent layer 11. That is, an upper surface 16a of the dichroic layer 16 is formed by the second laminated film 18 and a lower surface 16b of the dichroic layer 16 is formed by the first laminated film 17.

As illustrated in FIG. 4, it is assumed that $n_L$ is a refractive index of the first laminated film 17, $n_H$ is a refractive index of the second laminated film, N is a refractive index of the intermediate layer 13, $\theta_0$ is an angle of incidence of the incident light (the fluorescent light YL travelling downward) YL1 on the upper surface 16a of the dichroic layer 16, $\theta_H$ is a refractive angle of light by the second laminated film 18, and $\theta_L$ is a refractive angle of light by the first laminated film 17. In the embodiment, it is assumed that a refractive index $n_a$ of the fluorescent layer 11 is 1.85, the refractive index $n_L$ of the first laminated film 17 is 1.46, and the refractive index $n_H$ of the second laminated film 18 is 2.4.

Since $n_a \sin\theta_0 = n_H \sin\theta_H$ is established in the boundary between the dichroic layer 16 and the fluorescent layer 11, Formula (1) can be obtained.

$$\sin\theta_H = (n_a/n_H)\sin\theta_0 \qquad (1)$$

The incident light YL1 from the fluorescent layer 11 is transmitted through the second laminated film 18 with the greater refractive index than the fluorescent layer 11 and arrives at the first laminated film 17. The incident light YL1 is totally reflected by the boundary between the first laminated film 17 and the second laminated film 18, which depends on the magnitude of the angle of incidence $\theta_0$.

Here, a critical angle in the boundary between the first laminated film 17 and the second laminated film 18 is defined by Formula (2).

$$\theta_H = A\sin(n_L/n_H) \qquad (2)$$

From Formula (2), $\theta_H$ is 37.5°. Accordingly, light with an angle equal to or greater than $\theta_H=37.5°$ is totally reflected by the boundary between the first laminated film 17 and the second laminated film 18.

Light with an angle equal to or greater than $\theta_H=37.5°$ satisfies a relation of $(n_a/n_H)\sin\theta_0 > \sin(37.5)$ from Formula (1). Accordingly, light with the angle of incidence $\theta_0$ equal to or greater than 52.1° is reflected by the dichroic layer 16 to be emitted as the illumination light WL from the fluorescent layer 11.

In contrast, there is a possibility that light with the angle of incidence $\theta_0$ less than 52.10 out of the incident light YL1 is transmitted through the dichroic layer 16 and arrives at the rotation substrate 15a.

When $\theta_1$ is an angle of incidence of the light satisfying a brewster condition in the boundary between the first laminated film 17 and the second laminated film 18 in the dichroic layer 16, $\theta_1$ is defined by Formula (3).

$$\theta_1 = A\tan(n_H/n_L) \qquad (3)$$

When $\theta_2$ is a refractive angle of light satisfying the brewster condition in the boundary, $\theta_2$ is defined by Formula (4).

$$\theta_2 = A\tan(n_L/n_H) \qquad (4)$$

$\theta_1$ is 58.7° from Formula (3). Further, $\theta_2$ is 33.1° from Formula (4).

Since a reflection ratio of a P-polarized component of light satisfying the brewster condition (light with an angle of incidence $\theta_1$) is 0, that is, transmittance is 100%, the light arrives at the rotation substrate 15a. In the embodiment, the intermediate layer 13 totally reflects light with the angle of incidence $\theta_1$, thereby allowing much light to be emitted to the outside.

Here, when $\theta_1'$ is a critical angle in the intermediate layer 13, $\theta_1'$ is defined by Formula (5).

$$\theta_1' = A\sin(N/n_L) \qquad (5)$$

In the embodiment, the intermediate layer 13 satisfying a condition of $\theta_1 > \theta_1'$ is provided. Accordingly, the intermediate layer 13 totally reflects light that satisfies the brewster condition to thereby reach the interface between first laminated film 17 and the intermediate layer 13.

Specifically, according to Formula (5), it is sufficient that the refractive index N of the intermediate layer 13 is 1.25 or less. In the embodiment, the refractive index N is set to, for example, 1.25.

In the foregoing description, the case has been exemplified in which the first laminated film 17 is formed in the boundary of the dichroic layer 16 with the intermediate layer 13 and the second laminated film 18 is formed in the boundary of the dichroic layer 16 with the fluorescent layer 11. The second laminated film 18 may be formed in the boundary of the dichroic layer 16 with the intermediate layer 13 and the first laminated film 17 may be formed in the boundary of the dichroic layer 16 with the fluorescent layer 11. Even in this case, it is sufficient that the refractive index N of the intermediate layer 13 is 1.25 or less.

Incidentally, the fluorescent light YL includes light beams of various angle components. When light beams with different angles of incidence 80 are compared in consideration of a solid angle, light beams with a large angle of incidence $\theta_0$ are more contained than light beams with a small angle of incidence $\theta_0$ in the fluorescent light YL.

Figure 5:
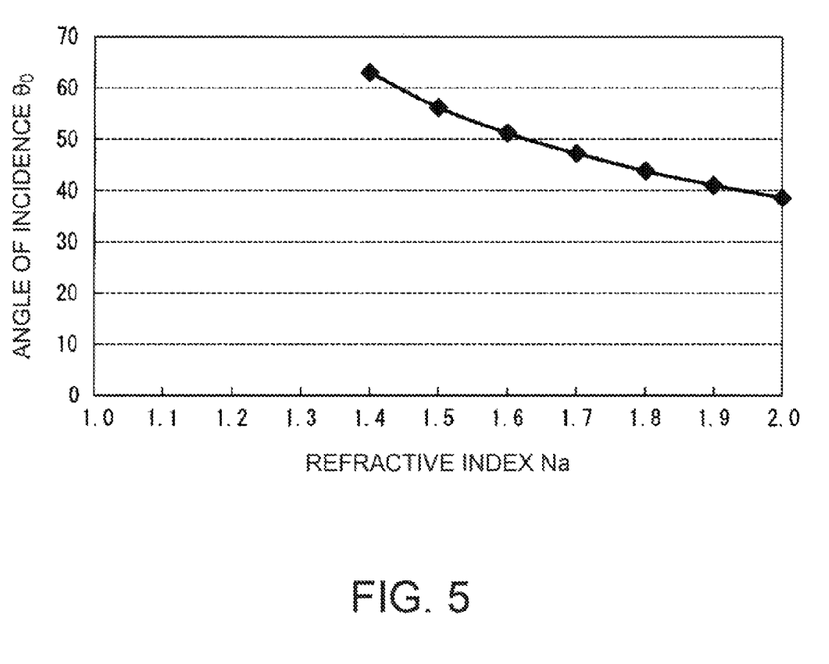
FIG. 5 is a diagram illustrating a relation between a refractive index of a fluorescent layer and an angle of incidence satisfying a brewster condition.

FIG. 5 is a graph illustrating a relation between the refractive index $n_a$ of the fluorescent layer 11 and the angle of incidence $\theta_0$ of the incident light YL1 satisfying the brewster condition in the boundary between the first laminated film 17 and the second laminated film 18. FIG. 5 is a graph illustrating a change in $\theta_0$ at which $\theta_2$ is 31.3° when $n_H$ is 2.4, $n_L$ is 1.46, $\theta_2$ is 31.3°, and $N_a$ is changed.

As illustrated in FIG. 5, when the refractive index $n_a$ of the fluorescent layer 11 is set to be large, the angle of incidence $\theta_0$ satisfying the brewster condition decreases. That is, when the refractive index $n_a$ of the fluorescent layer 11 is set to be large, a ratio of the light beam satisfying the brewster condition in the fluorescent light YL decreases. Therefore, the light travelling toward the rotation substrate 15a can be reduced.

Therefore, in the embodiment, the refractive index $n_a$ of the fluorescent layer 11 is set to 1.85 greater than the refractive index $n_L$ of 1.46 of the first laminated film 17.

Referring back to FIG. 2, the illumination light WL is incident on the integrator optical system 31 via the pickup optical system 40. The pickup optical system 40 includes a first lens 40a and a second lens 40b.

The integrator optical system 31 separates the illumination light WL into a plurality of small light fluxes. The integrator optical system 31 is configured to include, for example, a first lens array 31a and a second lens array 31b. The first lens array 31a and the second lens array 31b are formed by arranging a plurality of micro lenses in an array form.

The illumination light WL (the plurality of small light fluxes) emitted from the integrator optical system 31 is incident on the polarization conversion element 32. The polarization conversion element 32 converts the illumination light WL into linear polarized light. The polarization conversion element 32 is configured to include, for example, a polarization separation film, a phase difference plate, and a mirror.

The illumination light WL converted into the linear polarized light is incident on a superimposition lens 33a. The superimposition lens 33a superimposes a plurality of small light fluxes emitted from the polarization conversion element 32 on an illumination target object. Accordingly, the illumination target object can be uniformly illuminated. The superimposition optical system 33 according to the embodiment is configured to include the superimposition lens 33a and the integrator optical system 31 including the first lens array 31a and the second lens array 31b.

In the light source device 2 according to the embodiment, the intermediate layer 13, which is disposed between the dichroic layer 16 and the rotation substrate 15a and has the refractive index less than the rotation substrate 15a, totally reflects the light (part of the fluorescent light YL) transmitted through the dichroic layer 16, whereby the light exits to the outside through the fluorescent layer 11. Accordingly, since the fluorescent light YL generated in the fluorescent layer 11 can be efficiently used as the illumination light WL, the bright illumination light WL can be obtained.

Since the projector 1 according to the embodiment includes the light source device 2 with high light use efficiency, the projector with high light use efficiency can be provided.

Second Embodiment

Next, a second embodiment of the invention will be described. A difference between the embodiment and the first embodiment is a structure in which illumination light is generated in the light source device. Hereinafter, the structure of the light source device will be mainly described. The same reference numerals are given to the same constituent members as the constituent members in the first embodiment and the description thereof will be omitted.

Figure 6:
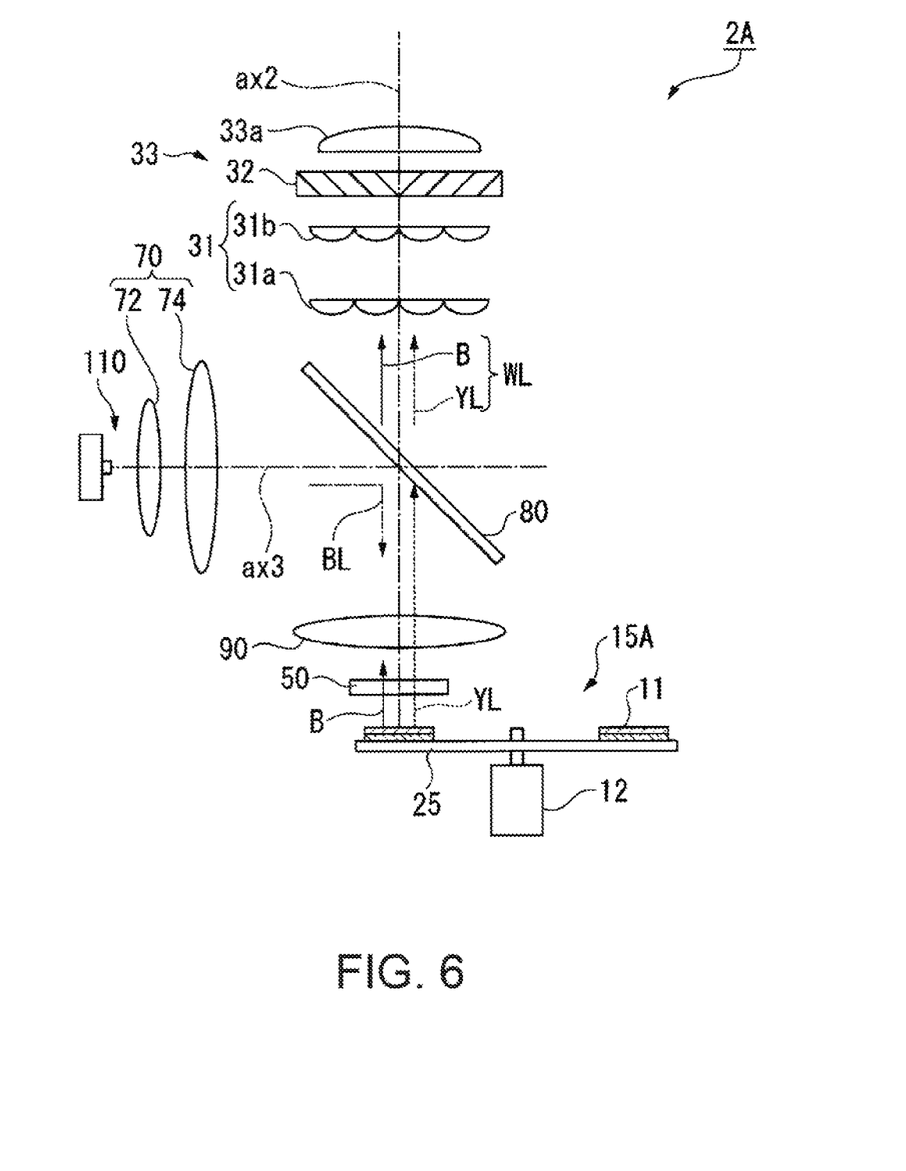
FIG. 6 is a diagram illustrating a schematic configuration of a light source device according to a second embodiment.

FIG. 6 is a diagram illustrating a schematic configuration of the light source device according to the embodiment.

As illustrated in FIG. 6, a light source device 2A according to the embodiment includes a light-emitting unit 110, a collimating optical system 70, a dichroic mirror 80, a condensing optical system 90, a phase difference plate 50, a fluorescent wheel (fluorescent light-emitting element) 15A, a motor 12, an integrator optical system 31, a polarization conversion element 32, and a superimposition optical system 33.

The light-emitting unit 110 is formed of a semiconductor laser (light-emitting element) that emits excitation light BL formed of laser light. The light-emitting unit 110 may be formed by one semiconductor laser and may be formed of multiple semiconductor lasers.

As the light-emitting unit 110, a semiconductor laser emitting blue light with a wavelength (for example, 460 nm) other than 445 nm can also be used.

In the embodiment, the light-emitting unit 110 is disposed so that an illumination optical axis ax3 is orthogonal to an illumination optical axis ax2.

The collimating optical system 70 includes a first lens 72 and a second lens 74 and substantially parallelizes light from the light-emitting unit 110. The first lens 72 and the second lens 74 are formed of convex lenses.

The dichroic mirror 80 is disposed to intersect at an angle of 45° with the illumination optical axis ax3 and the illumination optical axis ax2 of the light-emitting unit 110 in a light path from the collimating optical system 70 to the condensing optical system 90. The dichroic mirror 80 has a polarization separation function for blue light and passes yellow fluorescent light including red light and green light irrespective of the polarization state.

The excitation light BL from the light-emitting unit 110 is incident as S-polarized light on the dichroic mirror 80 and is reflected to the condensing optical system 90 by the dichroic mirror 80.

The condensing optical system 90 has a function of causing the excitation light BL from the dichroic mirror 80 to be incident on the fluorescent layer 11 of the fluorescent wheel 15A in a substantially condensed state and a function of picking up the fluorescent light emitted from the fluorescent wheel 15A.

Figure 7A:
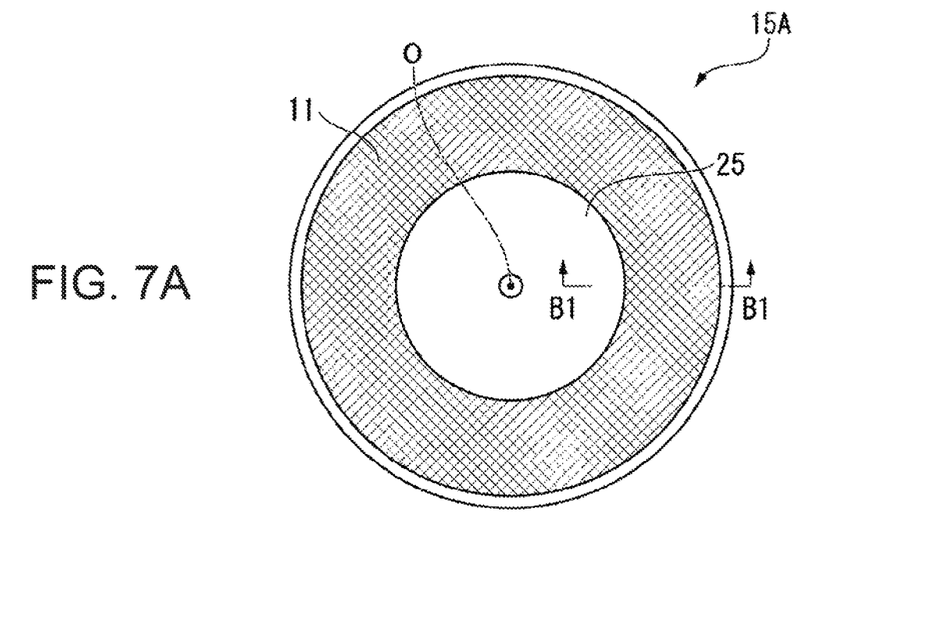
FIGS. 7A and 7B are configuration diagrams illustrating an example of a fluorescent wheel according to the second embodiment.
Figure 7B:
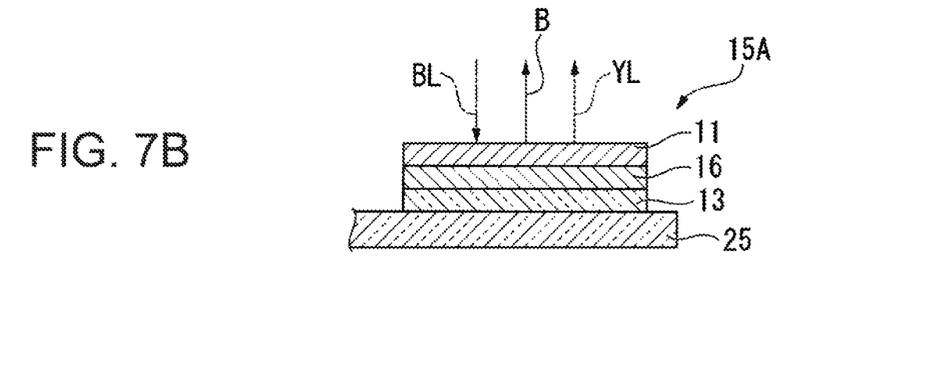

FIGS. 7A and 7B are diagrams illustrating the fluorescent wheel 15A according to the embodiment. FIG. 7A is a plan view illustrating the fluorescent wheel 15A and FIG. 7B is a sectional view taken along the line B1-B1 of FIG. 7A.

The fluorescent wheel 15A according to the embodiment is a reflective rotation fluorescent plate. As illustrated in FIGS. 6, 7A, and 7B, the fluorescent wheel 15A includes a ring-shaped intermediate layer 13, a dichroic layer 16 formed on the intermediate layer 13, and a fluorescent layer 11 formed on the dichroic layer 16 on a rotation substrate 25 which can be rotated by a motor 12.

In the embodiment, the fluorescent wheel 15A is a reflective wheel that emits fluorescent light YL toward the same side as the side on which the excitation light BL is incident.

The rotation substrate 25 is configured of a member with light transmission properties formed of, for example, quartz glass, crystal, sapphire, optical glass, or transparent resin. In the embodiment, a discoid glass substrate is used as the rotation substrate 25. Therefore, the refractive index of the rotation substrate 25 is 1.5.

The intermediate layer 13 has a refractive index less than the refractive index of 1.5 of the rotation substrate 25.

In the embodiment, the intermediate layer 13 is formed of, for example, transparent silica glass and has a refractive index of 1.25.

The fluorescent layer 11 is excited by the excitation light BL from the light-emitting unit 110 and emits the fluorescent light YL. The dichroic layer 16 reflects a component of the excitation light BL (blue light B which is a partial component in the excitation light BL) which is not absorbed in the fluorescent layer 11 and upward reflects a component emitted downward in the fluorescent light YL generated in the fluorescent layer 11.

The fluorescent light YL is transmitted through the dichroic mirror 80 to be incident on the integrator optical system 31. The blue light B is transmitted through the phase difference plate 50 again to be converted into P-polarized light by the dichroic mirror 80. The blue light B which is the P-polarized light is transmitted through the dichroic mirror 80 to be incident on the integrator optical system 31.

The blue light B emitted from another light-emitting unit disposed opposite to the light-emitting unit 110 in the dichroic mirror 80 may be reflected toward the integrator optical system 31 by the dichroic mirror 80 and may be combined with the fluorescent light YL to generate the illumination light WL.

The light source device 2A according to the embodiment causes the white illumination light WL obtained by combining the blue light B and the fluorescent light YL emitted from the fluorescent layer 11 to be incident on the integrator optical system 31.

In the fluorescent wheel 15A according to the embodiment, the intermediate layer 13 with a refractive index less than the rotation substrate 25 is disposed between the dichroic layer 16 and the rotation substrate 15a. Therefore, the light (the fluorescent light YL) transmitted through the dichroic layer 16 is reflected toward the condensing optical system 90 by the intermediate layer 13. Accordingly, the fluorescent light YL generated in the fluorescent layer 11 can be efficiently used as the illumination light WL.

The embodiment of the invention has been described above. However, the content of the invention is not limited to the foregoing form and can be appropriately modified within the range of the invention without departing from the gist of the invention.

For example, in the foregoing embodiment, the case in which the intermediate layer 13 is formed of transparent silica glass has been exemplified, but the invention is not limited thereto. For example, the intermediate layer 13 may be formed of a resin material.

In the foregoing embodiment, the case in which the rotation fluorescent wheel formed on the rotation substrate 15a or 25 is used in the fluorescent layer 11 has been exemplified, but the invention is not limited thereto.

For example, the invention may be adopted in a light source device that emits excitation light to the fluorescent layer 11 formed on a fixed substrate to generate fluorescence.

In the foregoing embodiment, the projector 1 including three light modulation devices 4R, 4G, and 4B has been exemplified, but the invention can also be applied to a projector in which a color video is displayed with one liquid crystal light modulation device. A digital mirror device may be used as a light modulation device.

In the foregoing embodiment, the example in which the light source device according to the invention is mounted on the projector has been described, but the invention is not limited thereto. The light source device according to the invention can be applied to a head light of an illumination equipment or an automobile.

The entire disclosure of Japanese Patent Application No. 2015-125566, filed on Jun. 23, 2015 is expressly incorporated by reference herein.

What is claimed is:

1. A wavelength conversion element comprising:
a substrate;
an intermediate layer that is provided on the substrate and has a refractive index less than a refractive index of the substrate;
a dichroic layer that is provided on the intermediate layer; and
a fluorescent layer that is provided on the dichroic layer and that is excited by light with a first wavelength band and thereby emits light with a second wavelength band different from the first wavelength band.

2. The wavelength conversion element according to claim 1,
wherein the dichroic layer has a multi-layer film structure in which at least one first laminated film and at least one second laminated film having a refractive index greater than a refractive index of the first laminated film are alternately laminated, and
wherein $\theta_1 > \theta_1'$ is satisfied, where $n_L$ represents the refractive index of the first laminated film, $n_H$ represents the refractive index of the second laminated film, $\theta_1$ represents an angle of incidence of light satisfying a brewster condition in a boundary between the first laminated film and the second laminated film, $\theta_1'$ represents a critical angle in the intermediate layer, N represents the refractive index of the intermediate layer, $\theta_1$ is defined as $A \tan(n_L/n_H)$, and $\theta_1'$ is defined as $A \sin(N/n_L)$.

3. The wavelength conversion element according to claim 2,
wherein $n_a > n_L$ is satisfied where $n_a$ represents a refractive index of the fluorescent layer.

4. The wavelength conversion element according to claim 1,
wherein the dichroic layer transmits light with the first wavelength band and reflects light with the second wavelength band.

5. The wavelength conversion element according to claim 1,
wherein the dichroic layer reflects light with the first wavelength band and light with the second wavelength band.

6. The wavelength conversion element according to claim 1,
wherein the fluorescent layer is configured of one of a fluorescent material and a resin material, a fluorescent material and an inorganic material, and only a fluorescent material.

7. A light source device comprising:
the wavelength conversion element according to claim 1; and
a light source that emits light with the first wavelength band.

8. A light source device comprising:
the wavelength conversion element according to claim 2; and
a light source that emits light with the first wavelength band.

9. A light source device comprising:
the wavelength conversion element according to claim 3; and
a light source that emits light with the first wavelength band.

10. A light source device comprising:
the wavelength conversion element according to claim 4; and
a light source that emits light with the first wavelength band.

11. A light source device comprising:
the wavelength conversion element according to claim 5; and
a light source that emits light with the first wavelength band.

12. A light source device comprising:
the wavelength conversion element according to claim 6; and
a light source that emits light with the first wavelength band.

13. A projector comprising:
the light source device according to claim 7;
a light modulation device that forms image light by modulating light, in accordance with image information, emitted from the light source device; and
a projection optical system that projects the image light.

14. A projector comprising:
the light source device according to claim 8;
a light modulation device that forms image light by modulating light, in accordance with image information, emitted from the light source device; and
a projection optical system that projects the image light.

15. A projector comprising:
the light source device according to claim 9;
a light modulation device that forms image light by modulating light, in accordance with image information, emitted from the light source device; and
a projection optical system that projects the image light.

16. A projector comprising:
the light source device according to claim 10;
a light modulation device that forms image light by modulating light, in accordance with image information, emitted from the light source device; and
a projection optical system that projects the image light.

17. A projector comprising:
the light source device according to claim 11;
a light modulation device that forms image light by modulating light, in accordance with image information, emitted from the light source device; and
a projection optical system that projects the image light.

18. A projector comprising:
the light source device according to claim 12;
a light modulation device that forms image light by modulating light, in accordance with image information, emitted from the light source device; and
a projection optical system that projects the image light.

* * * * *